United States Patent [19]

Kawase et al.

[11] 4,042,571
[45] Aug. 16, 1977

[54] FIRE-RETARDANT POLYAMIDES FROM NAPHTHALENE DICARBOXYLIC REACTANT AND HALOGENATED CARBOXYLIC REACTANT

[75] Inventors: Shoji Kawase; Takeo Shima; Keiichi Moriyama, all of Iwakuni, Japan

[73] Assignee: Teijin Limited, Osaka, Japan

[21] Appl. No.: 495,417

[22] Filed: Aug. 7, 1974

[30] Foreign Application Priority Data

Aug. 10, 1973 Japan .............................. 48-89205
Aug. 27, 1973 Japan .............................. 48-95115
July 18, 1974 Japan .............................. 49-81677

[51] Int. Cl.$^2$ .............................................. C08G 69/26
[52] U.S. Cl. ........................... 260/78 R; 260/30.8 R; 260/45.7 P; 260/78 A; 260/78 L
[58] Field of Search ................ 260/78 R, 78 S, 78 SC

[56] References Cited

U.S. PATENT DOCUMENTS

| 2,296,555 | 9/1942 | Hubert et al. ...................... 260/78 R |
| 2,621,168 | 12/1952 | Ross et al. ........................ 260/78 R |
| 3,047,542 | 7/1962 | Lang ................................ 260/78 R |
| 3,081,281 | 3/1963 | Beghin ............................. 260/78 R |
| 3,194,794 | 7/1965 | Caldwell et al. ................... 260/78 R |
| 3,349,062 | 10/1967 | Hill et al. ......................... 260/78 R |

OTHER PUBLICATIONS

Chemical Abstracts, vol. 68, 1968, 22670z.

*Primary Examiner*—Harold D. Anderson
*Attorney, Agent, or Firm*—Sherman & Shalloway

[57] ABSTRACT

A process for preparing a fired-retardant polyamide, which comprises polymerizing a carboxylic acid component consisting essentially of at least one naphthalene-dicarboxylic acid selected from the group consisting of naphthalene-2,7-dicarboxylic acid and naphthalene-2,6-dicarboxylic acid and/or its amide-forming derivative, and a halogen substituted-carboxylic acid and/or its amide-forming derivative, and an aliphatic diamine, the amount of said naphthalene dicarboxylic acid and/or its derivative being at least 40 mol% of the total acid component, and the amount of said halogen-substituted carboxylic acid being such that the halogen atom content of the polyamide is at least 0.13% by weight.

10 Claims, No Drawings

FIRE-RETARDANT POLYAMIDES FROM NAPHTHALENE DICARBOXYLIC REACTANT AND HALOGENATED CARBOXYLIC REACTANT

This invention relates to a process for preparing a fire-retardant polyamide, and more specifically to a process for preparing a polyamide having superior mechanical properties, chemical resistance, water resistance, thermal stability and fire retardancy.

Methods have heretofore been proposed in which various fire-retarding agents are incorporated in polyamides in order to render them fire-retardant. However, in order to impart the desired fire retardancy to the polyamide, it is necessary to add these fire-retarding agents in very great amounts, and as a result, various problems arise. For example, the fire-retardant reacts undesirably with the polyamide or markedly impairs the physical properties of the polyamide. Or the fire-retardant bleeds out from the polymer to cause a toxicity problem. Attempts to render polyamides fire-retardant by copolymerizing a dicarboxylic acid having a halogen atom bonded thereto with the polyamide may overcome the problem of bleed out, but lead to the defect that the polyamide becomes hygroscopic and totally devoid of water resistance.

Accordingly, an object of this invention is to provide a process for impairing fire retardance to polyamides effectively.

Another object of this invention is to provide a process for preparing a polyamide having superior mechanical properties, chemical resistance, water resistance and thermal stability as well as good fire retardancy.

We have made extensive and assiduous investigations about the manufacture of fire-retardant polyamides which would be able to achieve the above-mentioned objects of this invention. As a result, we have found that if a halogen substituted carboxylic acid is copolymerized with a naphthalene dicarboxylic acid and a diamine, there can be obtained a fire-retardant polyamide which at the same time has desirable mechanical properties, chemical resistance, water resistance and thermal stability. This discovery led to the present invention.

According to this invention, there is provided a process for preparing a fire-retardant polyamide, which comprises polymerizing a carboxylic acid component consisting essentially of at least one naphthalene-dicarboxylic acid selected from the group consisting of naphthalene-2,7-dicarboxylic acid and naphthalene-2,6-dicarboxylic acid and/or its amide-forming derivative, and a halogen-substituted carboxylic acid and/or its amide-forming derivative, and an aliphatic diamine, the amount of said naphthalenedicarboxylic acid and/or its derivative being at least 40 mol% of the total acid component, and the amount of said halogen-substituted carboxylic acid being such that the halogen atom content of the polyamide is at least 0.13% by weight.

The carboxylic acid component used in the process of this invention consists essentially of at least one naphthalene-dicarboxylic acid selected from naphthalene-2,7-dicarboxylic acid and naphthalene-2,6-dicarboxylic acid and/or its amide-forming derivative and a halogen substituted carboxylic acid and/or its amide-forming derivative.

The above naphthalenedicarboxylic acid and its amide-forming derivative are used in an amount of at least 40 mol%, preferably at least 50 mol%, more preferably at least 70 mol%, based on the total weight of the acid component, and the halogen-substituted carboxylic acid component and its amide-forming derivative are used in an amount such that the halogen atom content of the polyamide is at least 0.13% by weight, preferably 0.4 to 15% by weight, and more preferably 1.0 to 10% by weight.

Examples of the amide-forming derivatives of the naphthalenedicarboxylic acids are mono- or dialkyl esters such as dimethyl naphthalenedicarboxylate, diethyl naphthalenedicarboxylate or monoethyl naphthalenedicarboxylate, mono- or di-aryl esters such as diphenyl naphthalenedicarboxylate or monphenyl naphthlenedicarboxylate, mono- or di-acid halides such as naphthalenedicarboxylic acid dichloride, naphthalenedicarboxylic acid dibromide, or naphthalenedicarboxylic acid dichloride, and lower alkyl mono- or di-acid amides such as naphthalenedicarboxylic acid mono- or di-butyramide.

In the present application, the term "halogen-substituted carboxylic acids" denotes aliphatic, alicyclic or aromatic mono- or di-carboxylic acids with at least one hydrogen atom attached to a carbon atom in the carboxylic acid molecule substituted by at least one halogen such as fluorine, chlorine, bromine or iodine.

Of these, halogen-substituted aromatic carboxylic acids are preferred.

Preferably, the halogen-substituted monocarboxylic acid used in this invention does not contain other amide-forming functional groups. Examples of the halogen-substituted monocarboxylic acids include halogenated aliphatic monocarboxylic acids such as monochloroacetic acid, dichloroacetic acid, monobromoacetic acid, dibromoacetic acid, tribromoacetic acid, monoiodoacetic acid, diiodoacetic acid, triiodoacetic acid, monochloropropionic acids ($\alpha$- and $\beta$-substitution products), dichloropropionic acids ($\alpha$, $\alpha$-, $\alpha,\beta$- and $\beta,\beta$-substitution products), monobromopropionic acids ($\alpha$- and $\beta$-substitution products), dibromopropionic acids ($\alpha,\alpha$-, $\alpha,\beta$- and $\beta,\beta$-substitution products), monochloromonobromopropionic acids, ($\alpha$-chloro-$\alpha$-bromo-substitution product, $\alpha$-chloro-$\beta$-bromo-substitution product, $\alpha$-bromo-$\beta$-chloro-substituted product, and $\beta$-chloro-$\beta$-bromo-substituted product), $\beta,\beta$-diiodopropionic acid, $\beta,\beta,\beta$-triiodopropionic acid, $\alpha$-chlorobutyric acid, $\alpha$-bromobutyric acid, $\alpha$-bromoisobutyric acid, $\alpha$-bromovaleric acid, $\alpha$-chlorocaproic acid, $\alpha$-bromocaproic acid, $\alpha$-chlorocaprylic acid, $\alpha$-bromocaprylic acid, $\alpha$-chloropelargonic acid, $\alpha$-bromopelargonic acid, $\alpha$-bromocapric acid, $\alpha$-bromolauric acid, $\alpha$-bromopalmitic acid, $\alpha$-chlorostearic acid or $\alpha$-bromostearic acid; halogenated aromatic monocarboxylic acids such as monochlorobenzoic acid (2-, 3- and 4-substitution products), dichlorobenzoic acid (2,4-, 2,5-, 2,6-, and 3,5-isomers), monochloromonobromobenzoic acids (2-chloro-4-bromo substitution product, 2-bromo-4-chloro-substitution product, 2-chloro-5-bromo-substitution product, 2-bromo-5-chloro-substitution product, 2-chloro-6-bromo-substitution product, 3-chloro-4-bromo-substitution product, 3-bromo-4-chloro-substitution product, 3-chloro-5-bromo-substitution product), trichlorobenzoic acid (2,4,6-substitution product, and 2,3,6-substitution product) monochlorodibromobenzoic acids (2-chloro-4,6dibromo-substitution product, 4-chloro-2,6-dibromo-substitution product, 2,4-dibromo-6-chloro-substitution product, 2-chloro-3,6-dibromo substitution product, 3-chloro-2,6-dibromo-substitution product, 2,3-dibromo-6-chloro-substitution product), 2,4,5,6-tetrachlorobenzoic acids (2-, 3-, 4-substitution products), dibromobenzoic acids (2,4-, 2,5-, 2,6-, 3,4- and 3,5-substitution products), monobromomonoiodobenzoic acids (2-bromo-4-iodo-substitution product, 2-iodo-4-bromo-substitution product, 2-bromo-5-iodo-substitution product, 2-iodo-5-bromo-substitution product, 2-bromo-6-iodo-substitution product, 3-bromo-4-iodo-substitution product, 3-iodo-4-bromo-substitution product, 3-bromo-5-iodo-substitution product), 2,4,6-tribromobenzoic acid, 2,4,5,6-tetrabromobenzoic acid, monoiodobenzoic acids (2-, 3-, and 4-substitution products), iodobenzoic acids (2,4- and 3,4-substitution products), monochloromonoiodobenzoic acids (2-chloro-4-iodo-substitution product, 2-iodo-4-chloro-substitution product, 3-chloro-4-iodo-substitution product, and 3-iodo-4-chloro-substitution product, 2,4,6-triiodobenzoic acid, 2,4,5,6-tetraiodobenzoic acid, monochloro-1-naphthoic acids (5-, 7-, and 8-substitution products), 5,8-dichloro-1-naphthoic acid, monobromo-1-naphthoic acids (4-, 5-, 7-, and 8-substitution products), 5,8-dibromo-1-naphthoic acid, 8-iodo-1-naphthaoic acid, monochloro-2-naphthoic acids (1-, 3-, and 5-substitution products), 5-bromo-2-naphthoic acid, 5,8-dibromo-2-naphthoic acid, or 3-iodo-2-naphthoic acid; and halogenated alicyclic monocarboxylic acids such as monocyclohexanemonocarboxylic acids (2-, 3- and 4-substitution products), dichlorocyclohexanemonocarboxylic acids (2,4-, 2,5-, 2,6-, 3,4- and 3,5-substitution products), trichlorocyclohexanemonocarboxylic acid (2,4,6-substitution product), monobromocyclohexanemonocarboxylic acids (2-, 3-, and 4-substitution products), dibromocyclohexanemonocarboxylic acids (2,4-, 2,5-, 2,6-, 3,4- and 3,5-substitution products) and tribromocyclohexanemonocarboxylic acid (2,4,6-substitution product).

Examples of the halogen-substituted dicarboxylic acids used in this invention include halogen-substituted aliphatic dicarboxylic acids such as monochloroadipic acid, dichloroadipic acid, monobromoadipic acid, dibromoadipic acid, monochlorosebacic acid, dichlorosebacic acid, monobromosebacic acid, or dibromosebacic acid; halogenated aromatic dicarboxylic acids, for example, chloro and/or bromo-substituted terephthalic acids such as monochloroterephthalic acid, 2,5-dichloroterephthalic acid, tetrachloroterephthalic acid, monobromoterephthalic acid, 2,5-dibromoterephthalic acid, tetrabromoterephthalic acid, 2-chloro-5-bromoterephthalic acid, trichloromonobromoterephthalic acid, 2,3-dichloro-5,6-dibromoterephthalic acid, 2,5-dichloro-3,6-dibromoterephthalic acid, 2,6-dichloro-3,5-dibromoterephthalic acid, or monochlorotribromoterephthalic acid, chloro and/or bromo-substituted isophthalic acid such as 4-chloroisophthalic acid, 5-chloroisophthalic acid, 4,5-dichloroisophthalic acid, 4,6-dichloroisophthalic acid, 5,6-dichloroisophthalic acid, 4,5,6-trichloroisophthalic acid, tetrachloroisophthalic acid, 4-bromoisophthalic acid, 5-bromoisophthalic acid, 4,5-dibromoisophthalic acid, 4,6-dibromoisophthalic acid, 5,6-dibromoisophthalic acid, 4,5,6-tribromoisophthalic acid, tetrabromoisophthalic acid, 4-chloro-5-bromoisophthalic acid, 4-bromo-5-chloroisophthalic acid, 4,5-dichloro-6-bromoisophthalic acid or 4,6-dichloro-5-bromoisophthalic acid, and chloro-, bromo- and iodo-substituted naphthalenedicarboxylic acids such as monochloronaphthalene-2,7-dicarboxylic acids (1-, 3-, 4-substitution products), dichloronaphthalene-2,7-dicarboxylic acids (1,3-, 1,4-, 1,5-, 1,6-,1,8-, 3,4-, 3,5-, 3,6-, and 4,5-substitution products), monobromonaphthalene-2,6-dicarboxylic acids (1-, 3-, and 4-substitution products), monochloronaphthalene-2,6-dicarboxylic acids (1-, 3- and 4-substitution products), dichloronaphthalene-2,6-dicarboxylic acid (1,5-substitution product), monobromonaphthalene-2,6-dicarboxylic acid (1-substitution product), dibromonaphthalene-2,6-dicarboxylic acid (1,5-substitution product), or monoiodonaphthalene-2,7-dicarboxylic acid (1-substitution product); and halogenated alicyclic dicarboxylic acids such as monochlorocyclohexane-1,4-dicarboxylic acid, 2,5-dichlorocyclohexane-1,4-dicarboxylic acid, monobromocyclohexane-1,4-dicarboxylic acid, 2,5-dibromocyclohexane-1,4-dicarboxylic acid, 5-chlorocyclohexane-1,3-dicarboxylic acid or 5-bromocyclohexane-1,3-dicarboxylic acid.

Likewise, the amide-forming derivatives of these carboxylic acids can be used. Examples of useful amide-forming derivatives are mono- or di-alkyl esters such as dimethyl esters, diethyl esters or monomethyl esters of the above halogen-substituted carboxylic acids, mono- or di-aryl esters such as diphenyl esters or monophenyl esters of the above halogen-substituted carboxylic acids, mono- or di-acid halides such as dichlorides or dibromides of the above-mentioned halogen-substituted carboxylic acids, and lower alkyl mono- or di-acid amides such as mono- or di-butyramides of the above-mentioned halogen-substituted dicarboxylic acids.

If the amount of the naphthalene-dicarboxylic acid and/or its amide-forming derivative is less than 40 mol% of the total acid component, the mechanical properties, chemical resistance, water resistance and thermal stability, especially chemical resistance, of the resulting polyamides are undesirably reduced.

Furthermore, if the amount of the halogen-substituted carboxylic acid and/or its amide-forming derivative is so small as to reduce the halogen atom content of the resulting polyamide below 0.13% by weight, it is impossible to impart the desired fire-retardancy to the polyamides.

In order to impart sufficient fire-retardancy to the polymer, the proportion of the halogen-substituted monocarboxylic acid and/or its amide-forming derivative is preferably at least 0.5 mol% of the total carboxylic acid component. However, if the amount is too large, the degree of polymerization of the resulting polymer is too low. Accordingly, it is preferred that the amount of the halogen-substituted monocarboxylic acid and/or its amide-forming derivative is not more than 3 mol% of the total carboxylic acid component.

When the halogen-substituted dicarboxylic acid and/or its amide-forming derivative is used, its amount is limited to 2 to 60 mol%. If it is less than 2 mol%, sufficient fire-retardancy is not obtained. On the other hand, if it is more than 60 mol%, the polymer is colored or the melting point becomes too high. Also, other disadvantages arise when it is more than 60 mol% such as the difficulty of having the degree of polymerization increased.

As the acid component, other dicarboxylic acid and/or its amide-forming derivative or omega-aminocarboxylic acid and/or its amide-forming derivative may be used in an amount of up to 55 mol% based on the total acid component in addition to the naphthalenedicarboxylic acid and/or its amide-forming derivative and the halogen-substituted monocarboxylic acid and/or its amide-forming derivative. These additional acid components may be used alone or in admixture of two or more.

Examples of these additional dicarboxylic acids include aliphatic dicarboxylic acids such as adipic acid, azelaic acid, sebacic, acid, undecanedioic acid or dodecanedioic acid; alicyclic dicarboxylic acids such as cyclohexanedicarboxylic acid; and aromatic dicarboxylic acids such as terephthalic acid, isophthalic acid, 4-methylisophthalic acid and naphthalenedicarboxylic acids (2,6-isomer when the main acid component is a 2,7-isomer, 2,7-isomer when the main acid conponent is a 2,6-isomer, or 1,4-isomer when the main acid component is a 2,6-isomer).

Dicarboxylic acids containing other functional groups (for example, a hydroxyl or sulfonic acid group), or those containing an ether linkage, thioether linkage or sulfone linkage in the main chain can also be used. The amide-forming derivatives of these dicarboxylic acids can be likewise used. Examples of the amide-forming derivatives are alkyl esters (mono and di), aryl esters (mono and di), acid halides (mono and di), and acid amides (mono and di).

Examples of the omega-aminocarboxylic acid or its amide-forming derivatives are omega-amino aliphatic carboxylic acids such as omega-aminocaproic acid, omega-aminoethanthoic acid, omega-aminoundecanoic acid or omega-aminododecanoic acid, or their lactams (caprolactam, ethantholactam, undecalactam, and laurolactam); aminocarboxylic acids containing an alicyclic group such as aminomethylcyclohexylcarboxylic acid, and aminocarboxylic acids containing an aromatic ring such as aminomethylbenzoic acid. The alkyl esters, aryl esters, acid halides and acid amides of these aminocarboxylic acids can also be used.

In accordance with the process of this invention, the above acid component is polymerized with a diamine. Any diamines can be used which contain two amino groups in the molecule but no other amide-forming functional groups. Examples of suitable diamines used in this invention include alkylene diamines such as ethylene diamine, trimethylene diamine, tetramethylene diamine, pentamethylene diamine, hexamethylene diamine, heptamethylene diamine, octamethylene diamine, nonamethylene diamine, decamethylene diamine, undecamethylene diamine, dodecamethylene diamine, tridecamethylene diamine, tetradecamethylene diamine, hexadecamethylene diamine or octadecamethylene diamine; diamines containing an alicyclic group such as cyclohexylene diamine or bis(p-aminocyclohexyl) methane; diamines containing an aromatic ring such xylylene diamine or bis-aminopropyl benzene; and piperazines such as piperazine, 2-methylpiperazine or 2,5-dimethyl piperazine. Diamines containing other functional groups (for example, a hydroxyl or sulfonic acid group), or those containing an ether linkage, thioether linkage or sulfone linkage in the main chain can also be used. Of these, the alkylene diamines can be used preferably. The alkylene diamines preferably have 5 to 13, especially 6 to 12, carbon atoms when used in combination with the naphthalene-2,7-dicarboxylic acid and/or its amide-forming derivative, but preferably have 9 to 13, especially 10 to 12, carbon atoms when used in combination with the naphthalene-2,6-dicarboxylic acid and/or its amide-forming derivative. Alkylene diamines within these ranges have sufficient thermal stability for practical use, and are suitable for giving polyamides that can be processed by the melt-shaping techniques.

According to this invention, the acid component and the diamine are polymerized by any methods known in the art of manufacturing polyamides. Among these known methods are:

1. Method (melt-polymerization method) which comprises heating the materials under pressure in the presence of water to form a prepolymer, heating the prepolymer to a temperature above the melting point of the polymer while releasing the pressure, and allowing the polymerization to proceed by removing water from the reaction system through the introduction of an inert gaseous stream or the pressure reduction.

2. The method wherein the above materials are added to a solvent for the polyamide, and they are heated while passing an inert gaseous stream thereby to perform the polycondensation.

3. The method (interfacial polycondensation method) which comprises contacting a solution of the dicarboxylic acid dihalide with a solution of the diamine and performing polycondensation at their interface.

4. Solid phase polymerization method.

The use of the method (1) is especially preferred.

The melt-polymerization method (1) mentioned above can be carried out by heating the acid component and the diamine in an oxygen-free steam atmosphere to form a pre-polymer incapable of volatilization and then reducing the pressure of the steam; or heating the materials with stirring to a temperature above the melting point of the resulting polyamide while passing an inert gas such as nitrogen or reducing the pressure, and allowing them to be dehydrocondensed until the desired degree of polymerization is reached; or heating the naphthalene-dicarboxylic acid and/or its amide-forming derivative and the diamine under pressure in an oxygen-free steam atmosphere to form a prepolymer incapable of volatilization, and then adding the above halogen-substituted carboxylic acid and/or its amide-forming derivative, and heating them with stirring to a temperature above the melting point of the polyamide, and thus allowing them to be dehydrocondensed until the desired degree of polymerization is reached.

In the method (1) above, it is preferred to perform a stage of preparing the prepolymer at a temperature of 220° to 280° C., and the stage of carrying out the polymerization after removal of water from the polymerization system at a temperature of 250° to 310° C. and a temperature above the melting point of the polymer.

In polymerizing the acid component and the diamine in accordance with the process of this invention, it is possible to add to the polymerization system various additives, for example, a delusterant such as titanium oxide, a light or heat stabilizer, an antioxidant, a fluoroescent bleaching agent, a pigment, an antistatic agent, or a flame-proofing agent.

The dicarboxylic acid component and the halogen-substituted carboxylic acid component, even when used in small amounts, give rise to a high degree of fire retardancy of the resulting polyamide. Since these components are chemically bound to the polymer, the polyamide exhibits only a very low toxicity to the human body. In addition, there is an advantage that the excellent physical properties of the polyamide are not impaired, and the thermal stability, chemical resistance and water resistance of the resulting polyamide remain superior. Since the resulting polyamide has a reduced water imbibition and a reduced melting point, it can be easily melt-shaped. Furthermore, the polyamide obtained has a high heat distortion temperature, a high Young's modulus, a low heat shrinkage, and a reduced dimensional change by water. Furthermore, since the crystal size of the polymer is small, it has good transparency. When a shaped article of the polyamide is treated in boiling water, no turbidity or melt-adhesion occurs.

Especially when the halogen-substituted monocarboxylic acid component is used, the excellent physical properties of the polyamide can be well retained because the carboxylic component is bound only to the ends of the polymer.

The polyamides obtained by the process of this invention can be formed into fibers, films and other shaped articles by melt-shaping techniques. The resulting shaped articles are especially suitable for use in fields in which they are treated with boiling water, for example, medical instruments, sterilized bags, tableware, or water-supply devices, and also as oil-supply tubes by utilizing their oil resistance.

The following Examples and Comparative Examples illustrate the present invention in greater detail. In these examples, all parts are by weight. The evaluation of fire retardancy was performed by an oxygen index (LOI) according to JIS-K-720101972 (corresponding to ASTM D-2863), the number of ignitions, and UL 94 (September 1973). The number of ignitions and UL values were measured in the following manners.

1. Number of ignitions

A sample of fiber is dried at 50° C. for 24 hours, and then stored for 2 hours in a desiccator. One gram of the fiber is packed uniformly over a distance of 100 mm in a coil having an inside diameter of 10 mm and a length of 150 mm and made of a stainless steel wire (coil pitch 2 mm). The coil is inclined at an angle of 45°, and the fiber is ignited by bringing a butane gas burner close to the lower end of the coil. When the fire extinguishes, the fiber is again ignited by the burner. This is repeated, and the number of ignitions required until the entire sample has been burned out is measured. The larger number of ignitions shows better fire retardancy.

2. UL 94/September 1973 (Underwriters' Laboratories)

Test pieces of three different thickness with a size of 5 × 0.5 ×(¼, ⅛, 1/16 inch) are prepared, and maintained for 48 hours at 23° C. and a relative humidity of 50%. The test pieces so pre-treated are suspended perpendicularly, and the flame of a Bunsen burner is applied to the center of the lower end of each test pieces for 10 seconds. It is then withdrawn, and the flaming time is recorded. When the flaming time after the contact of the flame is within 30 seconds and the total flaming time after 10 replicates is within 250 seconds with respect to five test pieces as one group, and if the molten test piece that has fallen off causes fire in a surgical cotton placed under the test piece, the evaluation is 94V-1. If the molten test piece that has fallen off does not cause fire, the evaluation is 94V-2.

$\eta_{sp/c}$ is the reduced viscosity measured at 35° C. using concentrated sulfuric acid as a solvent in a concentration of 0.4g/100 ml.

EXAMPLE 1

Equimolar proportions of naphthalene-2,7-dicarboxylic acid and hexamethylene diamine were dissolved in water to form a salt. Then, ethyl alcohol was added to form hexamethylene diammonium naphthalene-2,7-dicarboxylate as a white powder which did not contain water of crystallization.

A synthetic linear polyamide was prepared by melt-polymerization of 299 parts (0.9 mol) of hexamethylene diammonium naphthalene-2,7-dicarboxylate, 30 parts (0.1 mol) of hexamethylene diammonium isophthalate (monohydrate), 4.0 parts of m-bromobenzoic acid (2.0 mol% based on the hexamethylene diammonium naphthalene-2,7-dicarboxylate), and 0.42 part of phosphorus acid (stabilizer) in the following manner.

An autoclave equipped with a stirrer was charged with the above compounds, and after purging with nitrogen, was heated at 290° C. in a sealed condition. The pressure inside the autoclave increased with time, but after 3.5 hours, the pressure stayed constant at 12.7 Kg/cm². Then, the pressure inside the autoclave was released to the atmospheric pressure while raising the temperature to 310° C. over the course of 1.5 hours. After the pressure reduction, heating was continued with stirring at 310° C. for 1.0 hour while passing nitrogen gas through the autoclave, thereby to complete the polymerization.

The polymerization product was withdrawn from the bottom of the autoclave in the form of ribbon, and cooled with water to form a transparent polyamide. The polymer was dried, and its physical properties were measured. It had a Vicat softening point of 163° C., a glass transition temperature of 138° C., an $[\eta_{sp/c}]$ of 0.789, and a bromine content of 0.50% by weight.

The polymer was dried, and then compression molded at a molding temperature of 300° C. using a mold on a hot press to form a rectangular rod with a size of 3 mm × 6.5 mm × 127 mm. The oxygen index (LOI) measured of this rod was 29.0%. The UL 94 value of this copolymer was 94V-2.

The polymer was stable to boiling and methanol.

EXAMPLE 2 AND COMPARATIVE EXAMPLE 1

334 parts (1 mol) of hexamethylene diammonium naphthalene-2,7-dicarboxylate, 4.0 parts (0.02 part) of p-bromobenzoic acid, and 0.41 part of phosphorus acid were polymerized in the same way as in Example 1 to form a polymer having a melting point of 289° C., an $[\eta_{sp/c}]$ of 0.967 and a bromine content of 0.52% by weight.

The polymer was dried, and melt spun at 310° C. by an extruder-type melt-spinning machine. The filaments were drawn to 4.0 times the original length while being passed over a hot plate held at 210° C. to form a yarn (24 filaments/71.8 denier). The yarn had a tenacity of 4.1 g/de, an elongation of 12.2% and a Young's modulus of 980 Kg/mm².

The number of ignition was tested, and the results are shown in Table 1.

For comparison, the above procedure was repeated except that 2.4 parts (0.02 mol) of benzoic acid was used instead of p-bromobenzoic acid. The results are also shown in Table 1.

Table 1

| | Polymer | Number of ignitions | | | | | |
|---|---|---|---|---|---|---|---|
| | | I | II | III | IV | V | Average |
| Example 2 | Polyhexamethylene naphthalene-2,7-dicarbamide (using 2 mol% of p-bromobenzoic acid) | 8 | 10 | 8 | 10 | 9 | 9.0 |
| Comparative Example 1 | " (using 2 mol% of benzoic acid) | 5 | 5 | 6 | 8 | 6 | 6.0 |

EXAMPLE 3

166 parts (0.5 mol) of hexamethylene diammonium naphthalene-2,7-dicarboxylate, 150 parts (0.5 mol) of hexamethylene isophthalate (monohydrate), 4 parts of m-bromobenzoic acid and 0.42 part of phosphorus acid were polymerized in the same way as in Example 1. The resulting polyamide had a Vicat softening point of 125° C., an $[\eta_{sp/c}]$ of 0.714 and a bromine content of 0.58%. The polymer had an oxygen index of 26.3. A shaped article made from this polymer was sufficiently tough.

COMPARATIVE EXAMPLE 2

100 parts (about 0.3 mol) of hexamethylene diammonium naphthalene-2,7-dicarboxylate, 210 parts (about 0.7 mol) of hexamethylene diammonium isophthalate, 4 parts of bromobenzoic acid and 0.42 part of phosphorus acid were polymerized in the same way as in Example 1. The resulting polyamide had a Vicat softening point of as low as 113° C., an $[\eta_{sp/c}]$ of 0.672 and a bromine content of 0.60% by weight. The oxygen index of this polymer was 26.6. The polymer was brittle, and no feasible shaped article could be made from it.

COMPARATIVE EXAMPLE 3

300 parts (1 mol) of hexamethylene diammonium isophthalate (monohydrate), 4 parts of m-bromobenzoic acid and 0.42 part of phosphorus acid were polymerized in the same way as in Example 1. The resulting polyamide had a Vicat softening point of 152° C., and an $[\eta_{sp/c}]$ of 0.703. The oxygen index of this polymer was 27.0. The polymer was brittle, and no feasible shaped article could be made from it.

EXAMPLES 4 TO 8

167 parts (0.5 mol) of hexamethylene diammonium naphthalene-2,7-dicarboxylate, 150 parts (0.5 mol) of hexamethylene diammonium isophthalate (monohydrate), 0.41 part (0.005 mol) of phosphorus acid, and 2,4-dichlorobenzoic acid in the proportion shown in Table 3 were polymerized in the same way as in Example 1.

The oxygen index, reduced viscosity and chlorine content of each of the resulting polyamides were measured, and the results are shown in Table 2.

Table 2

| Ex. | Amount of 2,4-dichlorobenzoic acid (mol%) | $\eta_{sp/c}$ | Chlorine content (%) | Oxygen index (%) |
|---|---|---|---|---|
| 4 | 0.4 | 1.43 | 0.15 | 25.0 |
| 5 | 0.66 | 1.20 | 0.24 | 25.8 |
| 6 | 0.75 | 0.99 | 0.27 | 26.5 |
| 7 | 1.20 | 0.84 | 0.44 | 27.5 |
| 8 | 3.33 | 0.65 | 1.23 | 28.8 |

EXAMPLES 9 TO 12

167 parts (0.8 mol) of hexamethylene diammonium naphthalenedicarboxylate, 22.6 parts (0.2 mol) of ε-caprolactam, 0.41 part (0.005 mol) of phosphorus acid and 0.02 mol of each of the halogenated monocarboxylic acids shown in Table 3 were polymerized in the same way as in Example 1. The polymers obtained had a Vicat softening point of 156° to 157° C. The results are shown in Table 3.

Table 3

| Ex. | Halogenated monocarboxylic acid | $\eta_{sp/c}$ | Halogen content (%) | Oxygen index (%) |
|---|---|---|---|---|
| 9 | Tribromoacetic acid | 0.79 | 1.7 | 30.2 |
| 10 | β,β-dibromopropionic acid | 0.82 | 1.1 | 29.5 |
| 11 | 5,8-dibromo-naphthoic acid | 0.78 | 1.1 | 29.5 |
| 12 | o-iodobenzoic acid | 0.87 | 0.97 | 27.0 |

EXAMPLE 13 AND COMPARATIVE EXAMPLE 4

200 parts (0.48 mol) of dodecamethylene diammonium naphthalene-2,7-dicarboxylate (anhydride), 0.41 part (0.005 mol) of phosphorus acid and 4.51 parts (0.02 mol) of 2,4,5-trichlorobenzoic acid were polymerized in the same way as in Example 1. There was obtained a crystalline polymer having an $[\eta_{sp/c}]$ of 0.88, a melting point of 247° C. and a chlorine content of 1.15%. The oxygen index of the polymer was measured in the same way as in Example 1.

For comparison, the above procedure was repeated except that 2.4 parts (0.02 mol) of benzoic acid was used instead of the 2,4,5-trichlorobenzoic acid. The results are shown in Table 4.

Table 4

| | Monocarboxylic acid | $[\eta_{sp/c}]$ | Oxygen index (%) |
|---|---|---|---|
| Example 13 | 2,4,5-trichlorobenzoic acid | 0.88 | 27.2 |
| Comparative Example 4 | Benzoic acid | 0.82 | 24.5 |

EXAMPLES 14 TO 17 AND COMPARATIVE EXAMPLES 5 AND 6

Equimolar proportions of hexamethylene diamine and naphthalene-2,7-dicarboxylic acid were dissolved in water to form a salt, and then methyl alcohol was added to form hexamethylene diammoniun naphthalene-2,7-dicarboxylate (to be abbreviated to 6N salt) as a white powder which was free from water of crystallization.

Similarly, hexamethylene diammonium-5-bromoisophthalate (to be abbreviated to 6-BIA salt) was prepared from hexamethylene diamine and 5-bromoisophthalic acid.

6N salt and 6-BIA salt were blended in varying proportions as shown in Table 5 so that the total amount was 1 mol, and polymerized in the following manner.

An autoclave equipped with a stirrer was charged with the 6-N salt and 6-BIA salt (the sum of these being 1 mol), 0.41 part (0.005 mol) of phosphorus acid (stabilizer) and 2.52 parts (0.0125 mol) of sebacic acid (molecular weight adjuster), and after purging with nitrogen, the autoclave was sealed, followed by heating at 280° C. The pressure inside the autoclave rose with time, but after 3 hours, it stayed constant at 11.8 Kg/cm². Then the inside pressure was released to atmospheric pressure while elevating the heating temperature to 310° C. over the course of 1.5 hours.

After the releasing of the pressure, refined nitrogen gas was passed through the autoclave, and heating with stirring was performed for one hour at 310° C. to complete the polymerization.

The resulting polymer was withdrawn from the bottom of the autoclave, and pulverized. The pulverized polymer was well dried, and compression molded at 300° C. using a hot press to form a rectangular rod with a size of 3mm × 6.5mm × 127mm. The oxygen index of this sample was measured.

For comparison, similar experiments were conducted with respect to the cases of not using 6-BIA salt and using 6-BIA salt in an excessive amount. The use of excessive 6-BIA salt was found undesirable because the degree of polymerization of the polymer was not sufficiently high.

The results are shown in Table 5.

Table 5

| Experiments | Copolymerization ratio (mol%) | | $[\eta_{sp/c}]$ | Vicat softening (° C.) | Bromine content (%) | Oxygen index (%) |
|---|---|---|---|---|---|---|
| | 6-N salt | 6-BIA salt | | | | |
| Comparative Example 5* | 100 | 0 | 0.99 | 293 | 0 | 27.0 |
| Example 14 | 95 | 5 | 0.97 | 280 | 1.34 | 28.5 |
| Example 15 | 90 | 10 | 0.92 | 141 | 2.70 | 29.0 |
| Example 16 | 80 | 20 | 0.88 | 131 | 5.45 | 30.1 |
| Example 17 | 50 | 50 | 0.62 | 122 | 13.8 | 34.5 |
| Comparative Example 6 | 30 | 70 | 0.323 | 128 | 19.5 | 36.0 |

*A homopolymer of 6-N salt had a high oxygen index, but its softening point was too high.

COMPARATIVE EXAMPLE 7

79 Parts (0.7 mol) of ε-caprolactam and 108 parts (0.3 mol) of 6-BIA salt were charged into an autoclave equipped with a stirrer, and polymerized in the same way as in Example 14 except that the polymerization temperature was changed to 260° C.

There was obtained a polymer having an $[\eta_{sp/c}]$ of 0.68. When this polymer was immersed in water at room temperature, it began to be dissolved at its surface, and finally deformed. In contrast, none of the polymers obtained in Examples 14 to 17 so changed in water.

EXAMPLES 18 TO 20

6N salt and a salt formed between hexamethylene diamine and each of the various halogen-substituted dicarboxylic acids shown in Table 6 were polymerized in the same way as in Example 14 so that the total amount of these salts was 1 mol.

The oxygen index of each of the resulting polyamide is shown in Table 6.

Table 6

| Ex. | 6-N salt (mol%) | Copolymer component | | Cl content (%) | Oxygen index (%) |
|---|---|---|---|---|---|
| | | Dicarboxylic acid | Ratio (mol%) | | |
| 18 | 90 | 2-Chloro-terephthalic acid | 10 | 1.24 | 28.5 |
| 19 | 90 | 2,5-dichloro-terephthalic acid | 10 | 2.20 | 28.5 |
| 20 | 90 | 2,5-dibromo-terephthalic acid | 10 | 5.20 | 29.5 |

EXAMPLE 21 AND COMPARATIVE EXAMPLE 8

In the same manner as in Example 14, dodecamethylene diammonium naphthalene-2,7-dicarboxylate (to be abbreviated to 12-N salt) was prepared from dodecamethylene diamine and naphthalene-2,7-dicarboxylic acid.

395 parts (0.95 mol) of 12-N salt, 18 parts (0.05 mol) of 6-BIA salt and 2.0 parts (0.01 mol) of sebacic acid were polymerized in the same way as in Example 14. There was obtained a polymer having a melting point of 241° C., an $[\eta_{sp/c}]$ of 1.03 and a bromine content of 1.0%. The oxygen index of this polymer was 28.0%.

The polymer was dried, and melt-spun at 280° C. using an extruder-type melt-spinning machine. The filaments were drawn to 4.0 times the original length while being passed over a hot plate held at 180° C. to form a yarn (24 filaments/73.3 denier). The yarn had a tenacity of 4.1 g/de, an elongation of 18.8%, and a Young's modulus of 770 Kg/cm².

The number of ignitions of this yarn sample was measured, and the results obtained are shown in Table 7.

For comparison, the above procedure was repeated except that 6-BIA was not used (Comparative Example 8). The results are also shown in Table 7.

Table 7

| | Polymer | Number of ignitions | | | | | |
|---|---|---|---|---|---|---|---|
| | | I | II | III | IV | V | Average |
| Example 21 | 6-BIA salt (5 mol% copolymerized) | 6 | 7 | 8 | 8 | 6 | 7 |
| Comparative Example 8 | 6-BIA salt not used | 4 | 5 | 6 | 4 | 3 | 4.4 |

EXAMPLES 22 TO 25

A nylon salt formed between naphthalene-2,6-dicarboxylic acid (NDA) and each of the diamines shown in Table 8 was mixed with a nylon salt (6-BIA salt) formed between hexamethylene diamine and 5-bromoisophthalic acid. Phosphorus acid and sebacic acid were added in amounts of 0.05 molar time and 0.0125 molar time respectively based on the total mol of these nylon salts. They were charged in an autoclave adapted to permit good stirring. These compounds were heated at 250° C. for 3 hours, and while further heating, the pressure was released gradually. Then, the polymerization was continued for another 60 minutes at 330° C.

A shaped article having a size of 3 mm × 6.5 mm × 127 mm was prepared from the resulting polymer, and its oxygen index was measured. The results are shown in Table 8.

Table 8

| Ex. | Nylon salt of NDA Diamine | mol% | Mol% of 6-BIA | $\eta_{sp/c}$ | Melting point (° C.) | Br content (%) | Oxygen index (%) | UL 94 evaluation |
|---|---|---|---|---|---|---|---|---|
| 22 | Nonamethylene diamine | 95 | 5 | 0.86 | 292 | 1.18 | 29.0 | 94V-2 |
| 23 | " | 90 | 10 | 0.76 | 280 | 2.35 | 30.0 | — |
| 24 | Dodeca- | 90 | 10 | 0.81 | 275 | 2.15 | 29.0 | — |

Table 8-continued

| Ex. | Nylon salt of NDA Diamine | mol% | Mol% of 6-BIA | $\eta_{sp/c}$ | Melting point (° C.) | Br content (%) | Oxygen index (%) | UL 94 evaluation |
|---|---|---|---|---|---|---|---|---|
| 25 | methylene diamine " | 80 | 20 | 0.69 | — | 4.40 | 30.5 | — |

EXAMPLES 26 TO 28

A salt (6-NDA salt) formed between dodecamethylene diamine and naphthalene-2,6-dicarboxylic acid and a salt formed between hexamethylene diamine and each of various halogen-substituted dicarboxylic acids shown in Table 9 were polymerized in the same way as in Example 22. The oxygen index of each of the polymers obtained was measured. The results are shown in Table 9.

Table 9

| Ex. | 6-NDA salt (mol%) | Copolymer component Dicarboxylic acid | Ratio (mol%) | $[\eta_{sp/c}]$ | Cl content (%) | Oxygen index (%) |
|---|---|---|---|---|---|---|
| 26 | 90 | 5-chloro terephthalic acid | 10 | 0.8 | 0.93 | 28.0 |
| 27 | 90 | 2,5-dichloro-terephthalic acid | 10 | 0.92 | 1.88 | 28.5 |
| 28 | 90 | 2,5-dibromo-terephthalic acid | 10 | 0.90 | 4.16 | 29.5 |

EXAMPLE 29 AND COMPARATIVE EXAMPLE 9

The polymer obtained in Example 24 and a polymer obtained in Example 24 without copolymerizing the halogen compound (Comparative Example 9) were each spun and drawn by a conventional method to form a yarn (about 75 denier/24 filaments).

The number of ignitions of these sample yarns was measured, and the results obtained are shown in Table 10.

Table 10

| Polymer | | Number of ignitions | | | | | Average |
|---|---|---|---|---|---|---|---|
| | | I | II | III | IV | V | |
| Example 29 | 10 mol% 6-BIA + 90 mol% dodeca-methylene diamine | 7 | 8 | 8 | 9 | 7 | 7.8 |
| Comparative Example 9 | Dodecamethylene diamine + NDA | 4 | 4 | 5 | 3 | 4 | 4 |

EXAMPLE 30 AND COMPARATIVE EXAMPLE 10

A nylon salt formed between naphthalene-2,6-dicarboxylic acid (NDA) and dodecamethylene diamine and 1 mol% of m-bromobenzoic acid were polymerized in the same way as in Example 22 to form a polyamide having an $[\eta_{sp/c}]$ of 0.78 and a bromine content of 0.20%. The oxygen index of this polymer was 27.0. When the polymer was subjected to a fire retardancy test in the same way as in Example 29, it was found that the number of ignitions was 5 to 8 showing an average of 6.4.

EXAMPLES 31 AND 32 AND COMPARATIVE EXAMPLE 10

Example 30 was repeated except that 2,4-dichlorobenzoic acid was added in the amount indicated in Table 11 instead of m-bromobenzoic acid used in Example 30. The results are shown in Table 11.

Table 11

| | Amount of 2,4-dichlorobenzoic acid (mol%) | $[\eta_{sp/c}]$ | Bromine content (%) | Oxygen index (%) |
|---|---|---|---|---|
| Example 31 | 1.0 | 0.82 | 0.17 | 27.0 |
| Example 32 | 3.0 | 0.60 | 0.55 | 27.8 |
| Comparative Example 10 | 0.6 | 1.27 | 0.11 | 24.0 |

EXAMPLE 33

In the polymer preparation step in Example 22, 0.5 mol% of p-bromobenzoic acid was further added. The resulting polymer had an $[\eta_{sp/c}]$ of 0.80, a bromine content of 1.28%, and an oxygen index of 29.5%.

What is claimed is:

1. A film- or fiber-forming fire retardant polyamide consisting essentially of the polymeric condensation product of (A) a carboxylic acid component consisting essentially of (1) at least one naphthalene dicarboxylic acid selected from the group consisting of naphthalene-2,7-dicarboxylic acid, naphthalene-2,6-dicarboxylic acid and its amide-forming derivative, and (2) at least one halogen-substituted dicarboxylic acid selected from the group consisting of a, halogen-substituted aliphatic di-carboxylic acid, halogen-substituted alicyclic dicarboxylic acid, and halogen-substituted carbocyclic aromatic dicarboxylic acid or their amide-forming derivatives these acids and derivatives being such that at least one hydrogen atom attached to a carbon atom in the dicarboxylic acid molecule is substituted by halogen atom and (B) an aliphatic diamine having 2 to 18 carbon atoms, the amount of said naphthalene dicarboxylic acid (1) being at least 70 mol% of the total acid component (A), and the amount of said halogen-substituted carboxylic acid being such that the halogen atom content of the polyamide is 1.0 to 10% by weight of the polyamide.

2. The polyamide of claim 1 wherein said halogen-substituted dicarboxylic acid is a halogen-substituted carbocyclic aromatic dicarboxylic acid.

3. The polyamide of claim 1 wherein said naphthalene-dicarboxylic acid is naphthalene-2,7-dicarboxylic acid and the aliphatic diamine contains 5 to 13 carbon atoms.

4. The polyamide of claim 1 wherein said naphthalene-dicarboxylic acid is naphthalene-2,6-dicarboxylic acid, and the aliphatic diamine contains 9 to 13 carbon atoms.

5. The polyamide of claim 1 wherein said halogen-substituted dicarboxylic acid component (2) is a halogen-substituted aliphatic dicarboxylic acid selected from the group consisting of monochloroadipic acid, dichloroadipic acid, monobromoadipic acid, dibromoadipic acid, monochlorosebacic acid, dichlorosebacic acid, monobromosebacic acid and dibromosebacic acid or the amide-forming derivatives thereof selected from dimethyl ester, diethyl ester, monomethyl ester, diphenyl ester monophenol ester, dichloride, dibromide, monobutyramide and dibutyramide.

6. The polyamide of claim 1 wherein said halogen-substituted dicarboxylic acid component (2) is a halogen-substituted alicyclic dicarboxylic acid selected from the group consisting of monochlorocyclohexane-1,4-dicarboxylic acid, 2,5-dichlorocyclohexane-1,4-dicarboxylic acid, monobromocyclohexane-1,4-dicarboxylic acid, 2,5-dibromocyclohexane-1,4-dicarboxylic acid, 5-chlorocyclohexane-1,3-dicarboxylic acid and 5-bromocyclohexane-1,3-dicarboxylic acid and 5-bromocyclohexane-1,3-dicarboxylic acid or the amide-forming derivatives thereof selected from the group consisting of dimethyl ester, diethyl ester, monomethyl ester, diphenyl ester, monophenyl ester, dichloride, dibromide, monobutyramide and dibutyramide.

7. The polyamide of claim 1 wherein said halogen-substituted dicarboxylic acid component (2) is a halogen-substituted carbocyclic aromatic dicarboxylic acid selected from the group consisting of monochloroterephthalic acid, 2,5-dichloroterephthalic acid, tetrachloroterephthalic acid, monobromoterephthalic acid, 2,5-dibromoterephthalic acid, tetrabromoterephthalic acid, 2-chloro-5-bromoterephthalic acid, trichloromonobromoterephthalic acid, 2,3-dichloro-5,6-dibromoterephthalic acid, 2,5-dichloro-3,6-dibromoterephthalic acid, 2,6-dichloro-3,5-dibromosterephthalic acid, 4-chloroisophthalic acid, 5-chloroisophthalic acid, 4,5-dichloroisophthalic acid, 4,6-dichloroisophthalic acid, 5,6-dichloroisophthalic acid, 4,5,6-trichloroisophthalic acid, tetrachloroisophthalic acid, 4-bromoisophthalic acid, 5-bromoisophthalic acid, 4,5-dibromoisophthalic acid, 4,6-dibromoisophthalic acid, 5,6-dicromoisophthalic acid, 4,5,6-tribromoisophthalic acid, tetrabromoisophthalic acid, 4-chloro-5-bromoisophthalic acid, 4-bromo-5-chloroisophthalic acid, 4,5-dichloro-6-bromoisophthalic acid and 4,6-dichloro-5-bromisophthalic acid or the amide-formimg derivatives thereof selected from the group consisting of dimethyl ester, diethyl ester, monomethyl ester, diphenyl ester, monophenyl ester, dichloride, dibromide, monobutyramide and dibutyramide.

8. The polyamide of claim 1 wherein said halogen-substituted dicarboxylic acid component (2) is a halogen-substituted carbocyclic aromatic dicarboxylic acid selected from the group consisting of 1-chloro-naphthalene-2,7-dicarboxylic acid, 3-chloro-naphthalene-2,7-dicarboxylic acid, 4-chloronaphthalene-2,7-dicarboxylic acid, 1,3-dichloronaphthalene-2,7-dicarboxylic acid, 1,4-dichloronaphthalene-2,7-dicarboxylic acid, 1,5-dichloronaphthalene-2,7-dicarboxylic acid, 1,6-dichloronaphthalene-2,7-dicarboxylic acid, 1,8-dichloronaphthalene-2,7-dicarboxylic acid, 3,4-dichloronaphthalene-2,7-dicarboxylic acid, 3,5-dichloronaphthalene-2,7-dicarboxylic acid, 3,6-dichloronaphthalene-2,7-dicarboxylic acid, 4,5-dichloronaphthalene-2,7-dicarboxylic acid, 1-bromonaphthalene-2,6-dicarboxylic acid, 3-bromonaphthalene-2,6-dicarboxylic acid, 4-bromonaphthalene-2,6-dicarboxylic acid, 1-chloronaphthalene-2,6-dicarboxylic acid, 3-chloronaphthalene-2,6-dicarboxylic acid, 4-chloronaphthalene-2,6-dicarboxylic acid, 1,5-dichloronaphthalene-2,6-dicarboxylic acid, 1,5-dibromonaphthalene-2,6-dicarboxylic acid and 1-iodonaphthalene-2,7-dicarboxylic acid or the amide-forming derivatives thereof consisting from the group consisting of dimethyl ester, diethyl ester, monomethyl ester, diphenyl ester, monophenyl ester, dichloride, dibromide, monobutyramide and dibutyramide.

9. The polyamide of claim 1 wherein said aliphatic diamine (B) is selected from the group consisting of ethylene diamine, trimethylene diamine, tetramethylene diamine, pentamethylene diamine, hexamethylene diamine, heptamethylene diamine, octamethylene diamine, nonamethylene diamine, decamethylene diamine, undecamethylene diamine, dodecamethylene diamine, tridecamethylene diamine, tetradecamethylene diamine, hexadecamethylene diamine and octadecamethylene diamine.

10. The polyamide of claim 1 which is the polymeric condensation product of (A) a carboxylic acid component consisting essentially of (1) naphthalene-2,7-dicarboxylic acid and (2) 2,5-dichloro-terephthalic acid with (B) hexamethylene diamine.

* * * * *